No. 790,042. Patented May 16, 1905.

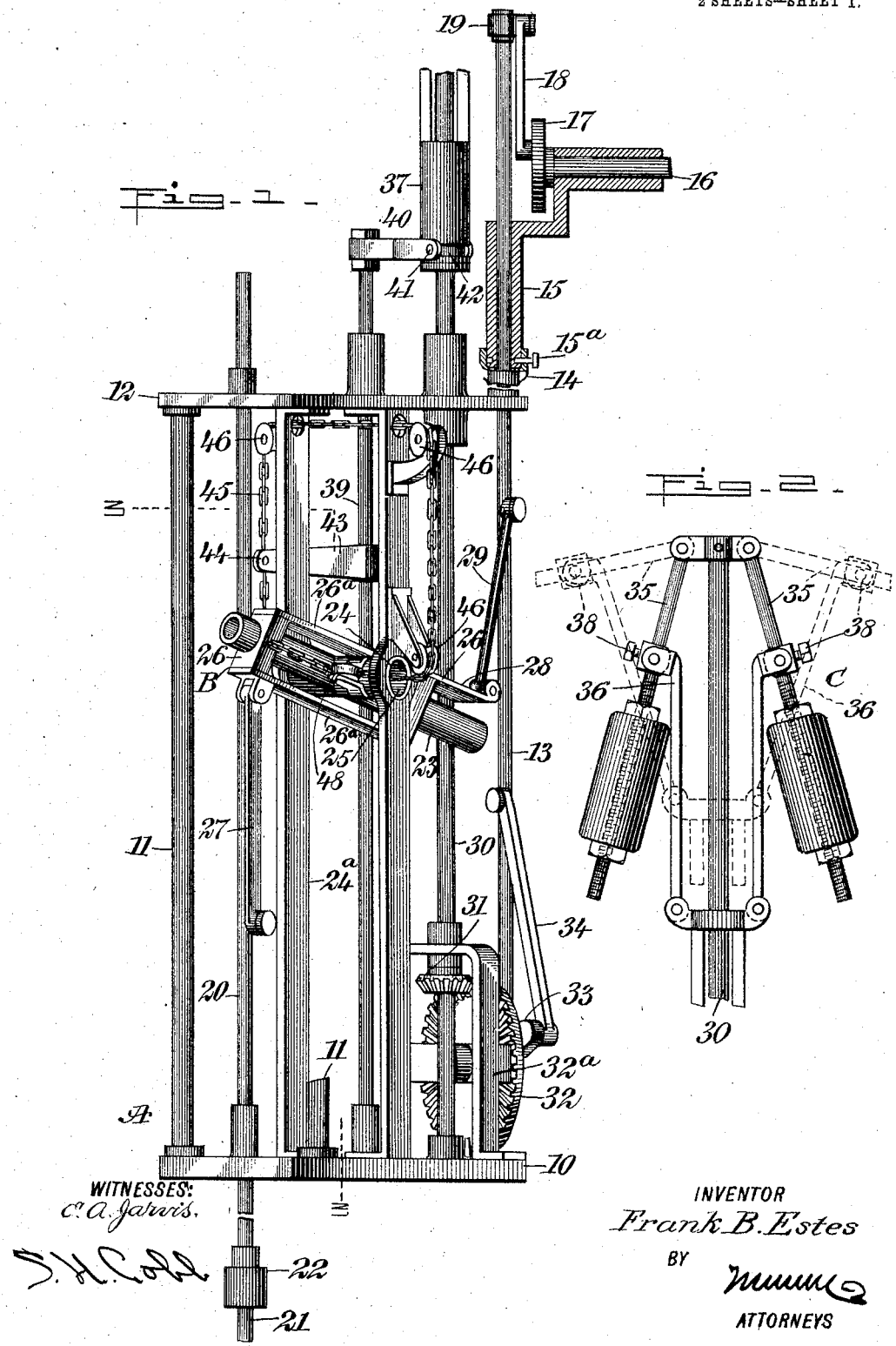

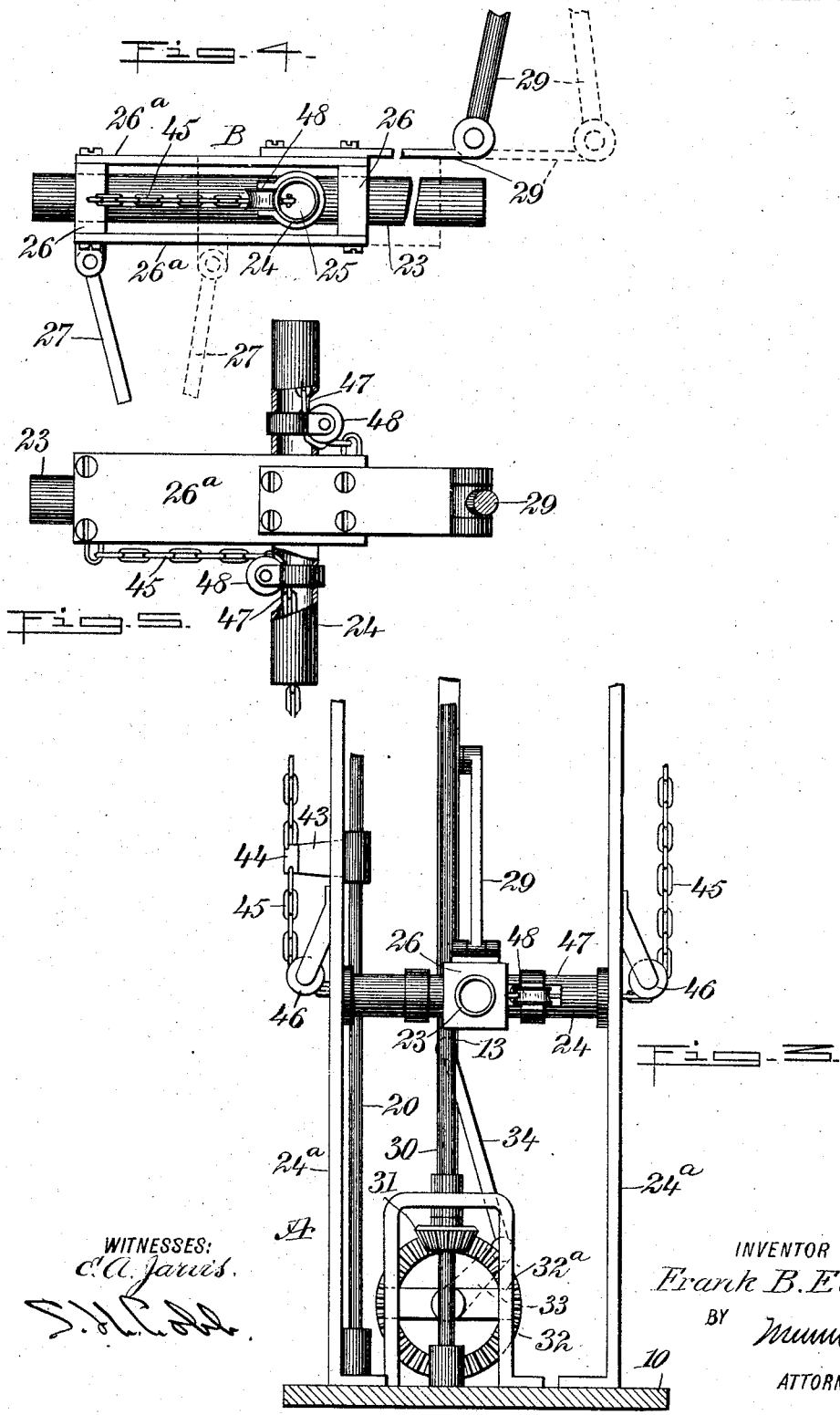

UNITED STATES PATENT OFFICE.

FRANK B. ESTES, OF BOISE, IDAHO.

CONTROLLING MECHANISM.

SPECIFICATION forming part of Letters Patent No. 790,042, dated May 16, 1905.

Application filed January 28, 1905. Serial No. 243,095.

*To all whom it may concern:*

Be it known that I, FRANK B. ESTES, a citizen of the United States, and a resident of Boise, in the county of Ada and State of Idaho, have invented a new and Improved Controlling Mechanism, of which the following is a full, clear, and exact description.

My invention relates to controlling mechanisms, and particularly to those adapted for regulating the power supplied by windmills to such apparatus as pumps. Its principal objects are to provide means for maintaining a substantially constant output of the driven apparatus irrespective of the speed of rotation of the windmill.

Reference is to be had to the accompanying drawings, forming a part of this specification, in which similar characters of reference indicate corresponding parts in all the views.

Figure 1 is a broken side elevation of one embodiment of my invention. Fig. 2 is a similar view of the governor. Fig. 3 is a sectional elevation on the line 3 3 in Fig. 1. Fig. 4 is a detail in side elevation of the lever system, and Fig. 5 is a broken top plan view thereof.

A designates a supporting-frame, which may comprise a base 10, uprights or standards 11, rising therefrom, and a platform 12. In the base and platform a rod or driving member 13 is mounted to reciprocate longitudinally, while in a socket 14, surrounding this rod and carried by the platform, is supported a windmill, of which there is here illustrated only the upright 15, turning in the socket and retained against displacement by a screw 15$^a$, projecting into a circumferential groove. In this upright is journaled the power-shaft 16 of the windmill, having at its inner end a crank-disk 17, which is connected by a link 18 with a collar 19, which is preferably rotatable about the rod 13, thus providing for the revolution of the mill and adapting itself to currents of air from different directions. Reciprocating through the base and platform is a driven member or rod 20, which at its lower end may be joined to a pump-rod 21 by a coupling 22. The driving and driven members are connected by a lever system, which is shown as consisting of a supporting-section 23, of cylindrical form and having projecting near its center at opposite sides trunnions 24, oscillating in standards 24$^a$, rising from the base, these trunnions preferably having hollow ends 25. Mounted to reciprocate upon the supporting-section is a connecting-section B conveniently in the form of an open frame, having end pieces 26, through openings in which the section 23 extends, these end pieces being connected by side bars 26$^a$. The connecting-section is pivotally joined near one end to the rod 20 by a link 27, while at its opposite end one of the side members is extended at 28, and to this and to the rod 13 a link 29 is articulated.

Journaled in the base and platform is a shaft 30, having fixed to it near its lower extremity a pinion 31, which meshes with a gear 32, rotatably mounted upon a frame 32$^a$ and having a crank 33, which is connected by a link 34 with the rod 13. This connecting system communicates the rotation of the windmill to a governor C, preferably of the centrifugal type and having the ordinary weighted arms 35 pivoted at the upper end of the shaft 30, these arms being connected by links 36 with a sleeve 37, sliding upon the shaft. The connections between the arms and links may be provided with set-screws 38, enabling the throw of the weights to be varied, as is customary in devices of this character. Sliding in the base and platform adjacent to the governor-shaft is a governor-rod 39, having an arm 40 extending from it, with projections 41 entering a groove 42 in the sleeve 37. Below the platform the governor-rod carries an arm 43, which is clamped at 44 upon a chain or flexible member 45. This chain passes in one direction from the arm 43 over guide-rolls 46, attached to the standards 24$^a$, and then into one of the hollow portions of the trunnion through an opening 47 and over a guide-roll 48, fixed upon the trunnion, and has its end secured to one extremity of the connecting-section B. From the opposite side of the clamp the chain is guided by a roll 46, similar to those previously described, and extends within the opposite hollow trunnion end through an opening 47 and is directed by a roll 48 upon the opposite side of the supporting-section from that first mentioned to the other extremity of the connecting-section to which it is fixed.

If the windmill were joined directly to the pump, the volume of water delivered by the latter would be proportionate to the speed of rotation of the former. By the use of my improved controlling mechanism, however, when the speed of the wheel increases the governor-weights will be raised. The connections between the elements are such that when this occurs the chain will be drawn over its guide-rolls to automatically shift the connecting-section of the lever system to the right, as seen in Fig. 1 of the drawings. This shortens the lever-arm which is actuating the pump and the stroke of said pump in an inverse ratio to the increase of speed, thus maintaining the amount of fluid delivered substantially constant. If, on the other hand, the rotation of the wheel becomes slower, the weights of the governor fall, moving the connecting-section in the opposite direction and increasing the stroke of the pump.

Having thus described my invention, I claim as new and desire to secure by Letters Patent—

1. The combination with a governor, of power-transmitting members, a lever having sections movable relatively longitudinally of one another, and means operable by the governor for moving one of the sections.

2. The combination with a governor, of power-transmitting members, a lever system connecting the members, and a flexible member connecting the governor with one of the elements of the lever system.

3. The combination with a driving-rod, of a driven rod, a longitudinally-movable lever connecting the rods, and automatic means for moving the lever.

4. The combination with a driving-rod, of a driven rod, a longitudinally-movable lever connecting the rods, and a centrifugal governor connected with the lever.

5. The combination with an oscillatory member, of a connector movable upon said member, driving and driven rods pivotally joined to the connector, and means for moving the connector upon the member.

6. The combination with an oscillatory member, of a connector movable upon said member, driving and driven rods pivotally joined to the connector, a governor, and a flexible member fixed near opposite ends of the connector and joined to the governor.

7. The combination with an oscillatory member, of a connector movable upon said member, driving and driven rods pivotally joined to the connector, a governor, a rod reciprocated by the governor, and a flexible member fixed near the opposite ends of the connector and to the governor-rod.

8. The combination with an oscillatory member having hollow trunnions upon which it is supported, of a connector movable upon said member, driving and driven rods pivotally joined to the connector, a governor, and a flexible member fixed near opposite ends of the connector, extending through the trunnions and being joined to the governor.

In testimony whereof I have signed my name to this specification in the presence of two subscribing witnesses.

FRANK B. ESTES.

Witnesses:
  W. E. PALMER,
  W. S. WALKER.